(12) United States Patent
Hu et al.

(10) Patent No.: US 10,977,869 B2
(45) Date of Patent: Apr. 13, 2021

(54) INTERACTIVE METHOD AND AUGMENTED REALITY SYSTEM

(71) Applicant: GUANGDONG VIRTUAL REALITY TECHNOLOGY CO., LTD., Guangzhou (CN)

(72) Inventors: Yongtao Hu, Guangzhou (CN); Sibin Huang, Guangzhou (CN); Jingwen Dai, Guangzhou (CN); Jie He, Guangzhou (CN)

(73) Assignee: GUANGDONG VIRTUAL REALITY TECHNOLOGY CO., LTD., Guangzhou (CN)

(*) Notice: Subject to any disclaimer, the term of this patent is extended or adjusted under 35 U.S.C. 154(b) by 0 days.

(21) Appl. No.: 16/601,556

(22) Filed: Oct. 14, 2019

(65) Prior Publication Data
US 2020/0043242 A1    Feb. 6, 2020

Related U.S. Application Data

(63) Continuation of application No. PCT/CN2019/096029, filed on Jul. 15, 2019.

(30) Foreign Application Priority Data

Jul. 20, 2018  (CN) .......................... 201810804421.8
Nov. 16, 2018  (CN) .......................... 201811369467.8

(51) Int. Cl.
*G06T 19/00*    (2011.01)
*G02B 27/01*    (2006.01)
(Continued)

(52) U.S. Cl.
CPC .......... *G06T 19/006* (2013.01); *A63F 13/213* (2014.09); *G02B 27/017* (2013.01);
(Continued)

(58) Field of Classification Search
None
See application file for complete search history.

(56) References Cited

U.S. PATENT DOCUMENTS 8,926,428 B1 * 1/2015 Nakayama .............. A63F 13/87
463/31
2018/0314484 A1 * 11/2018 Pahud ................... A63F 13/213
(Continued)

FOREIGN PATENT DOCUMENTS

CN    105468142 A    4/2016
CN    107358657 A    11/2017
(Continued)

*Primary Examiner* — Joni Hsu

(57) ABSTRACT

An interactive method comprises: obtaining a first spatial position of the first terminal device relative to a marker; determining a first display position of a first virtual object in virtual space according to the first spatial position; receiving interaction data sent from a second terminal device, wherein the interaction data includes model data of a second virtual object and a second spatial position of the second virtual object relative to a marker; determining a second display position of the second virtual object in virtual space according to the first spatial position and the second spatial position; generating the first virtual object according to the first display position, and the second virtual object according to the data of the second virtual object and the second display position; and displaying the first virtual object and the second virtual object.

18 Claims, 9 Drawing Sheets

(51) Int. Cl.
  *G06F 3/01* (2006.01)
  *A63F 13/213* (2014.01)
  *G06T 19/20* (2011.01)
  *G06F 3/0481* (2013.01)

(52) U.S. Cl.
  CPC .............. *G06F 3/011* (2013.01); *G06F 3/017* (2013.01); *G06F 3/04815* (2013.01); *G06T 19/20* (2013.01); *G02B 2027/014* (2013.01)

(56) References Cited

U.S. PATENT DOCUMENTS

| | | | | |
|---|---|---|---|---|
| 2018/0348987 | A1* | 12/2018 | Sawaki | .................... G06F 1/163 |
| 2019/0155033 | A1* | 5/2019 | Gelman | ................ G03H 1/2205 |
| 2019/0243599 | A1* | 8/2019 | Rochford | .............. G06F 3/1454 |

FOREIGN PATENT DOCUMENTS

| | | | |
|---|---|---|---|
| EP | 2426645 | B1 | 2/2013 |
| WO | WO2013187129 | A1 | 12/2013 |

* cited by examiner

INTERACTIVE METHOD AND AUGMENTED REALITY SYSTEM

CROSS-REFERENCE TO RELATED APPLICATIONS

The present application is a continuation-application of International (PCT) Patent Application No. PCT/CN2019/096029 filed on Jul. 15, 2019, which claims foreign priorities of Chinese Patent Application No. 201810804421.8, filed on Jul. 20, 2018 in the China National Intellectual Property Administration, and Chinese Patent Application No. 201811369467.8, filed on Nov. 16, 2018 in the China National Intellectual Property Administration, the entire contents of which are hereby incorporated by reference.

TECHNICAL FIELD

The present disclosure relates to the technical field of augmented reality, in particular, relates to an interactive method for virtual content, and a terminal device.

BACKGROUND

With the advancement of technology, Augmented Reality (AR) technology has gradually become a research hotspot at home and abroad. Augmented reality is a technology that increases users' perception to the real world through information provided by computer systems, it superimposes computer-generated content objects, such as virtual objects, scenes, or system prompt information into real scenes, and thereby enhances or modifies the perception to the real world environment or to data representing the real world environment.

SUMMARY OF THE APPLICATION

The present disclosure provides an interactive method for virtual content, a terminal device, and a memory medium.

In a first aspect, one embodiment of the present disclosure provides an interactive method applied in a first terminal device, the method comprises: obtaining, by a first terminal device, a first spatial position of the first terminal device relative to a marker; determining, by the first terminal device, a first display position of a first virtual object in virtual space according to the first spatial position; receiving, by the first terminal device, interaction data sent from a second terminal device, wherein the interaction data includes model data of a second virtual object and a second spatial position of the second virtual object relative to a marker; determining, by the first terminal device, a second display position of the second virtual object in virtual space according to the first spatial position and the second spatial position; generating, by the first terminal device, the first virtual object according to the first display position, and the second virtual object according to the data of the second virtual object and the second display position; and displaying, by the first terminal device, the first virtual object and the second virtual object.

In a second aspect, one embodiment of the present disclosure provides a terminal device comprising a memory and a processor, the memory stores a computer program, and the computer program, when being executed by the processor, enables the processor to realize the interactive method provided by the first aspect.

In a third aspect, one embodiment of the present disclosure provides a computer storage medium, which stores a computer program, and the computer program, when being executed by a processor, realizes the interactive method provided by the first aspect.

BRIEF DESCRIPTION OF THE DRAWINGS

In order to illustrate the technical solutions in the embodiments of the present disclosure more clearly, the drawings required to be used in the description of the embodiments will be briefly described below. It is obvious that the drawings in the following description are only some embodiments of the present disclosure. For one of ordinary skill in the art, other drawings may also be obtained according to these drawings without paying any creative effort.

DETAILED DESCRIPTION

The technical solutions in the embodiments of the present disclosure will be clearly and completely described below in accompany with the accompanying drawings in the embodiments of the present disclosure. It is obvious that the described embodiments are only some of the embodiments of the present disclosure, but not all embodiments. Based on the embodiments of the present disclosure, all other embodiments obtained by those skilled in the art without paying any creative effort belong to the protection scope of the present disclosure.

Figure 1:
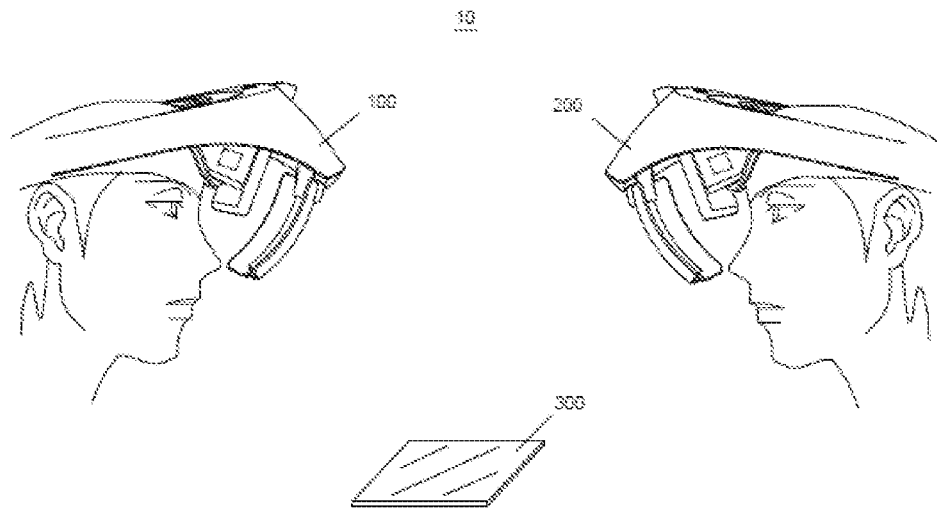
FIG. 1 is a schematic view of an augmented reality system provided by one embodiment of the present disclosure.

Referring to FIG. 1, the present disclosure provides an augmented reality system 10 comprising a first terminal device 100, a second terminal device 200, and a marker 300. Wherein, the system 10 can include more terminal devices, of which the specific number is not limited. The terminal devices may be head-mounted displays, or mobile devices such as mobile phones or tablets. When the terminal devices are head-mounted display units, they may be integrated head-mounted display units; the terminal devices may also be smart terminals such as mobile phones connected with external head-mounted display units, that is, a terminal device can be used as a processing and memory device of a head-mounted display unit, and be inserted into or access an external head-mounted display unit to display a virtual object in the head-mounted display unit.

Figure 2:
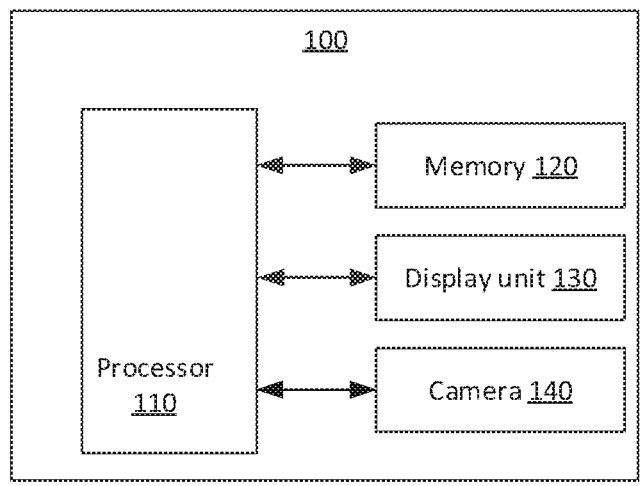
FIG. 2 is a structural block diagram of a first terminal device provided by one embodiment of the present disclosure.

Referring to FIG. 2, the first terminal device 100 is a head-mounted display unit, and includes a processor 110, a memory 120, a display unit 130, and a camera 140. The memory 120, the display unit 130, and the camera 140 are all connected with the processor 110.

The camera 140 is configured to capture images and transmit the images to the processor 110. It can be an infrared camera, a color camera, and so on, and its specific type is not limited in the present disclosure.

The processor 110 can be any suitable type of general purpose or special purpose microprocessor, digital signal processor or microcontroller, which can be configured to receive data and/or signals from various components of the system via, for example, a network, and may also process the data and/or signals to determine one or more operating conditions in the system. For example, the processor generates image data of a virtual world according to pre-stored image data, and sends the image data of the virtual world to the display unit for display; or may also receive image data sent from a smart terminal or a computer through a wired or wireless network, and generate an image of a virtual world for display according to the received image data; or may also perform identification and position according to an image captured by the camera, and determine corresponding display content in a virtual world according to positioning information, and send the display content to the display unit for display. Wherein, the processor 110 is not limited to being mounted in the first terminal device 100.

The memory 120 is configured to store software programs and modules. The processor executes various functional applications and data processing by running the software programs and modules stored in the memory 120. The memory 120 can be a high speed random access memory, a non-volatile memory, etc., such as a magnetic memory device, a flash memory, or other non-volatile solid state memories.

In some embodiments, the first terminal device 100 can include more or less components, for example, the first terminal device 100 further includes a communication module connected with the processor and configured for communication between the first terminal device 100 and other devices. The second terminal device 200 can have same or similar components as the first terminal device 100, and is not repeated here.

In some embodiments, when the terminal device is a mobile terminal connected with an external head-mounted display unit, a display unit and a camera of the external head-mounted display unit are connected with the mobile terminal; at this time, the memory of the mobile terminal stores instruction of a corresponding program, and the processor of the mobile terminal executes the program instruction.

When the marker 300 is located within a visual range of the camera of the terminal device, the camera can capture an image of the marker 300, and the processor performs identifying and tracking calculation for the captured image to obtain identity of the marker 300 and position and pose of the marker 300 relative to the terminal device. The pattern of the marker 300 is not limited in the present application as long as it can be identified and tracked by the terminal device. For example, the marker includes a pattern with a topological structure, and the topological structure refers to a connected relationship between sub-markers and feature points in the marker.

Figure 3:
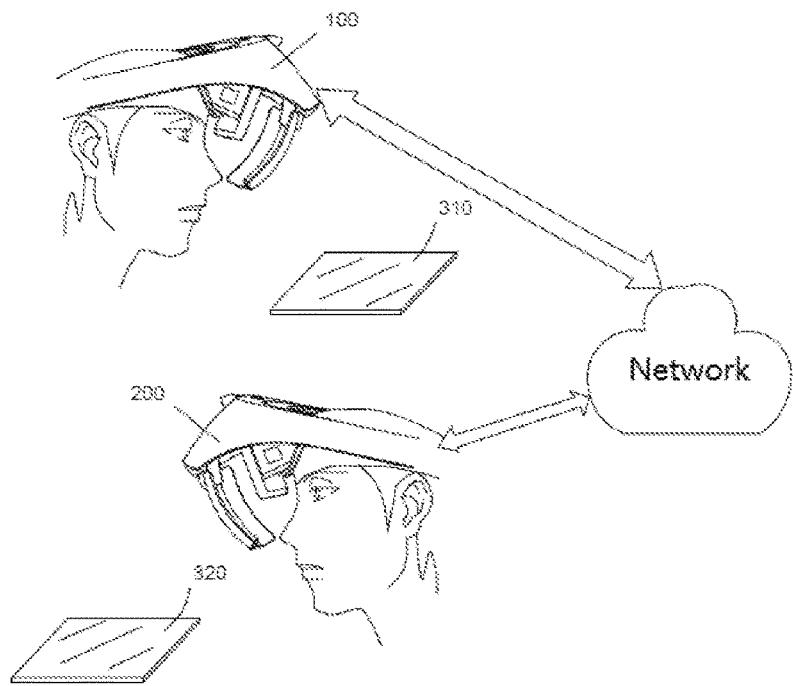
FIG. 3 is a schematic view of another augmented reality system provided by one embodiment of the present disclosure.

Referring to FIG. 3, in some scenes, the marker 300 can include a first marker 310 and a second marker 320. The first terminal device 100 and the second terminal device 200 can be in different places, or may also be in the same place, and perform data interaction through network communication. Wherein, the first terminal device 100 corresponds to the first marker 310, and can capture an image including the first marker 310 to identify and track the first marker 310; the second terminal device 200 corresponds to the second marker 320, and can capture an image including the second marker 320 to identify and track the second marker 320.

In traditional augmented reality technology, a terminal device generally only displays virtual content independently, and does not relate to interaction among a plurality of terminal devices. In order to realize augmented reality interaction between terminal devices, each terminal device should display virtual content of other terminal devices in addition to displaying its own virtual content, and a plurality of users can perform virtual content interaction between each other through their respective terminal devices.

Figure 4:
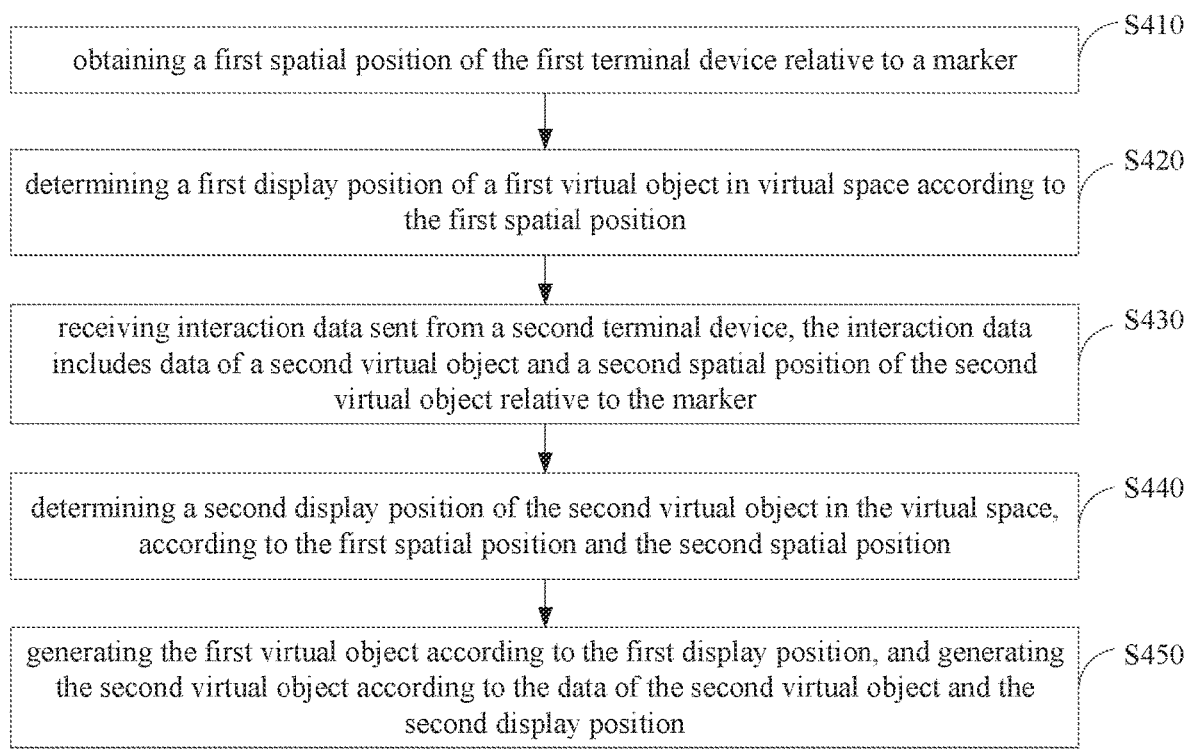
FIG. 4 is a flow chart of an interactive method provided by one embodiment of the present disclosure.

Referring to FIG. 4, an interaction display method for virtual content applied in a first terminal device is provided according to an embodiment of the present disclosure. The method may be performed by the first electronic device, and the method may include actions/operations in the following blocks.

At block S410, obtaining a first spatial position of the first terminal device relative to a marker.

When the first terminal device needs to display virtual content of other terminal devices and virtual content corresponding to the first terminal device, a marker can be used as a reference object so as to obtain the position where virtual content of other terminal devices needs to be displayed. The first terminal device can perform image capture for a marker in its visual range through a camera, and perform identifying and tracking for the marker in images to obtain first spatial position information of the first terminal device relative to the marker. Wherein, the first spatial position information includes position and pose of the first terminal device relative to the marker, the pose includes orientation information and rotation information.

The first terminal device can obtain identity of the marker by identifying the marker, different markers have different identities, and relationship between markers and corresponding identity are stored in the first terminal device. Furthermore, corresponding relationship between identity of markers and relevant data may also be stored in the first terminal device, after the first terminal device identifies identity of a marker, the identity of the marker can be used to read data corresponding to the marker. Specifically, model data of a virtual object corresponding to the marker can be read. For example, a marker a1 corresponds to a virtual object b1, model data of the virtual object b1 can be read after the first terminal device identifies and obtains identity of the marker a1, based on the corresponding relationship between the marker a1 and the virtual object b1.

The specific method for identifying and tracking the marker to obtain the position and pose of the first terminal device relative to the marker and the identity of the first terminal device is not limited in the present disclosure.

At block S420, determining a first display position of a first virtual object in virtual space according to the first spatial position.

The first terminal device can determine a first display position where a first virtual object corresponding to a first terminal device needs to be displayed in virtual space according to the first spatial position. Wherein, the first virtual object corresponding to the first terminal device can be superimposed and displayed near the marker, and may also be superimposed and displayed on the marker.

In one embodiment, the first terminal device may determine a position coordinate of the first virtual object that needs to be superimposed and displayed relative to the first terminal device in real space according to a preset position of the first virtual object relative to the marker, and the first spatial position of the first terminal device relative to the marker, wherein the marker is used as a reference, and convert the position coordinate into a rendering coordinate in the virtual space, the rendering coordinate is configured to indicate a display position of the first virtual object in the virtual space.

At block S430, receiving interaction data sent from a second terminal device, the interaction data includes data of a second virtual object and a second spatial position of the second virtual object relative to the marker.

In order to realize interactive display between the first terminal device and the second terminal device, the first terminal device can display the first virtual object and the second virtual object corresponding to the second terminal device at the same time. The first terminal device can be connected with the second terminal device, the second terminal device can send the interaction data of the second virtual object to the first terminal device in real time, the interaction data is configured to display the second virtual object corresponding to the second terminal device in real time in the first terminal device. Wherein, the interaction data can include data of the second virtual object and the second spatial position of the second virtual object relative to the marker. Correspondingly, the first terminal device receives interaction data sent from the second terminal device, and determines a position relation between the second virtual object and the first terminal device according to the second spatial position of the second virtual object relative to the marker, which is contained in the interaction data.

In some embodiments, the data of the second virtual object can be model data, the model data can be configured to establish and render a model of the second virtual object, and can include colors, apex coordinates in a 3D model, etc., which are configured to establish the model corresponding to the second virtual object. For example, when the second virtual object is a colored line segment, a 3D point queue (a plurality of point coordinates in display space) of the line segment, a thickness of the line segment, a color of the line segment, and the like can be used as the model data.

At block S440, determining a second display position of the second virtual object in the virtual space, according to the first spatial position and the second spatial position.

The first terminal device may determine a position coordinate of an area where the second virtual object is superimposed and displayed in real space relative to the first terminal device according to the first spatial position of the first terminal device relative to the marker and the second spatial position of the second virtual object relative to the marker, wherein the marker is used as a reference, convert the position coordinate into a rendering coordinate in the virtual space, and thereby obtain the second display position of the second virtual object in the virtual space.

At block S450, generating the first virtual object according to the first display position, and generating the second virtual object according to the data of the second virtual object and the second display position.

In one embodiment, the first terminal device can read data of the first virtual object, and render at the first display position in virtual space to generate the first virtual object. The first terminal device utilizes data of the second virtual object of received interaction data sent from the second terminal device and renders at the second display position in virtual space to generate the second virtual object. The first terminal device displays the first virtual object and the second virtual object at the same time through the display unit, and a user can observe corresponding positions where the first virtual object and the second virtual object are superimposed and displayed in real space through the first terminal device.

When a position and/or a pose of the first terminal device relative to the marker changes, the displayer virtual object changes correspondingly. For example, when the first terminal device goes away from a position of a virtual object in a real scene, the displayed virtual object becomes smaller; when the first terminal device approaches a position of a virtual object in a real scene, the displayed virtual object becomes bigger.

The first terminal device, at the same time of displaying the first virtual object and the second virtual object, can send interaction data corresponding to the first virtual object to the second terminal device, the interaction data corresponding to the first virtual object can include data of the first virtual object and a spatial position of the first virtual object relative to the marker. The second terminal device may also display the second virtual object and the first virtual object corresponding to the first terminal device at the same time according to received interaction data corresponding to the first virtual object sent from the first terminal device.

In some embodiments, there can be a plurality of second terminal devices. The first terminal device can display the first virtual object and the second virtual object corresponding to each second terminal device at the same time and thereby realize augmented reality display and interaction among a plurality of terminal devices.

Figure 5:
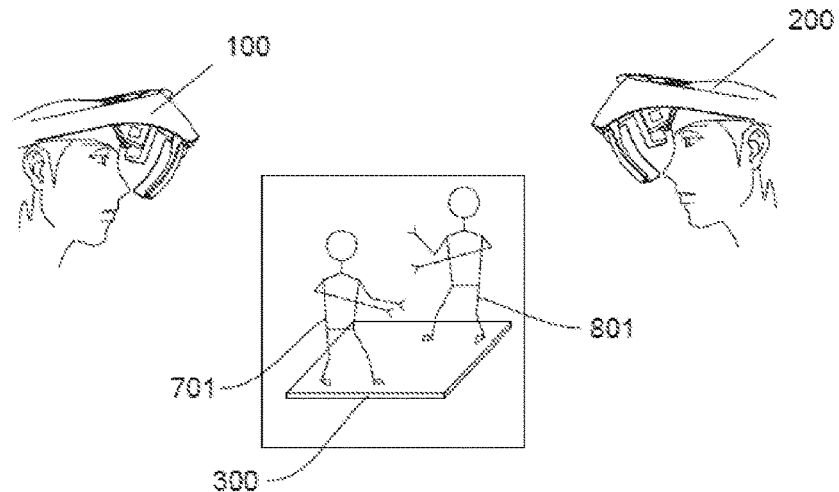
FIG. 5 is a scenario schematic view provided by one embodiment of the present disclosure.

FIG. 5 shows an interactive display scene of the present disclosure. Wherein, display content of the first terminal device 100 includes a first virtual object 701 corresponding to the first terminal device 100 and a second virtual object 801 corresponding to the second terminal device 200, and the display content of the second terminal device 200 also includes the first virtual object 701 corresponding to the first terminal device 100 and the second virtual object 801 corresponding to the second terminal device 200, the display contents of the two terminal devices are similar, but display visual angles are different. The interactive method provided by this embodiment of the present disclosure can realize interactive display of virtual objects between the first terminal device 100 and the second terminal device 200, and thereby realizes interactive display between the two terminal devices.

In the interactive method provided by this embodiment of the present disclosure, the first terminal device determines the display coordinate of the first virtual object in the virtual space according to the first spatial position relative to the marker, determines the display coordinate of the second virtual object in the virtual space according to the second spatial position of the second virtual object relative to the marker sent from the second terminal device, and synchronously displays the first virtual object and the second virtual object in combination with data of the second virtual object, thereby realizing interactive display between devices and enhancing interaction between users in augmented reality.

Figure 6:
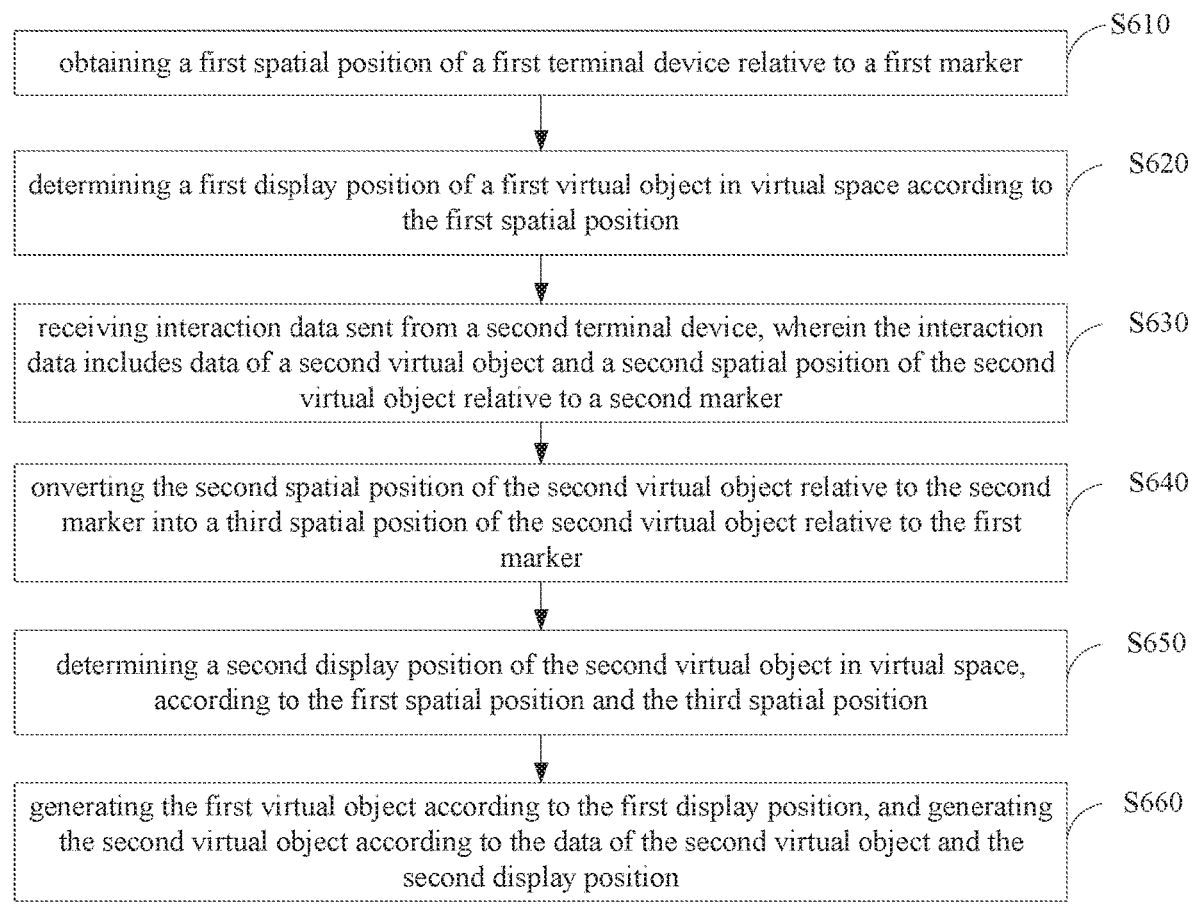
FIG. 6 is a flow chart of an interactive method provided by another embodiment of the present disclosure.

FIG. 6 shows a flow chart of an interactive method provided by another embodiment of the present disclosure.

The method may be performed by the second electronic device, and the method may include actions/operations in the following blocks.

At block S610, obtaining a first spatial position of a first terminal device relative to a first marker.

In some embodiments, the marker can include a first marker and a second object. When the first and second terminal devices realize interactive display, the first terminal device can identify and track the first marker to obtain a spatial position of the first terminal device relative to the first marker, and the second terminal device can identify and track the second marker to obtain a spatial position of the second terminal device relative to the first marker. The first marker and the second marker can be the same marker, and may also be different markers.

When the first terminal device and the second terminal device are located in different actual scenes, the first terminal device and second terminal device can correspond to different markers and can establish remote communication connection; the first and second terminal devices can identify the corresponding markers respectively to realize interactive display.

At block S620, determining a first display position of a first virtual object in virtual space according to the first spatial position.

At block S630, receiving interaction data sent from a second terminal device, wherein the interaction data includes data of a second virtual object and a second spatial position of the second virtual object relative to a second marker.

The second terminal device can obtain a second spatial position of the second virtual object relative to a second marker, and send interaction data including the second spatial position of the second virtual object relative to the second marker and data of the second virtual object to the first terminal device. Correspondingly, the first terminal device receives the interaction data including the data of the second virtual object and the second spatial position of the second virtual object relative to the second marker.

At block S640, converting the second spatial position of the second virtual object relative to the second marker into a third spatial position of the second virtual object relative to the first marker.

When the first terminal device obtains the second spatial position, it can convert the second spatial position, take the first marker as a reference, and obtain a third spatial position of the second virtual object relative to the first marker. As one way, the second marker can be equated as the first marker, and the second spatial position can be directly used as the third spatial position of the second virtual object relative to the first marker.

At block S650, determining a second display position of the second virtual object in virtual space, according to the first spatial position and the third spatial position.

After obtaining the first spatial position and the third spatial position, the first marker can be used as a reference so as to obtain a position of the second virtual object relative to the first terminal device, that is, obtain a position coordinate of the second virtual object that needs to be superimposed and displayed in real space, and thus the position coordinate is converted into a rendering coordinate in virtual space of the first terminal device so as to obtain the second display position of the second virtual object.

At block S660, generating the first virtual object according to the first display position, and generating the second virtual object according to the data of the second virtual object and the second display position.

In some embodiments, when the first and second terminal devices are located in different scenes, the situation that a spatial position of the first terminal device relative to the first marker is the same as a spatial position of the second terminal device relative to the second marker may occur; at this time, a spatial position of the second virtual object relative to the second marker can be adjusted so as to prevent the situation that the first virtual object overlaps with the second virtual object. The first terminal device can determine whether the first spatial position of the first terminal device relative to the first marker and the second spatial position of the second terminal device relative to the second marker belong to the same area. In one embodiment, the first marker can be used as a reference to divide a plurality of different areas, the different areas can correspond to different orientations of the first marker, for example, when the first marker is taken as a reference, if the first marker is rectangular, orientations corresponding to four edges of the first marker can correspond to different areas respectively; if belonging to the same area, the first terminal device can adjust a spatial position of the second terminal device relative to the second marker to obtain an adjusted spatial position of the second terminal device relative to the second marker, such that the adjusted spatial position and the first spatial position are located in different areas; and then convert the second spatial position of the second virtual object relative to the second marker based on the adjusted spatial position to obtain a third spatial position of the second virtual object relative to the first marker, and thereby determine a second display position of the second virtual object in the first terminal device. In one embodiment, adjusting the spatial position of the second terminal device relative to the second marker can be mirror transformation for the spatial position of the second terminal device relative to the second marker, such that the spatial position of the second terminal device relative to the second marker is opposite to the previous position, and thereby prevent the situation that the second virtual object and the first virtual object coincide with each other or are displayed at the same side of the marker from occurring and ensure remote interaction.

In one embodiment, the terminal devices can also be located in the same scene, each terminal device corresponding to one marker respectively, and the respectively corresponding markers are different; each terminal device identifies a corresponding marker, can obtain identity corresponding to the marker, and thereby obtain a corresponding virtual object according to the identity. For example, a first virtual object corresponding to the first terminal device and the first marker can be a weapon A, a second virtual object corresponding to the second terminal device and the second marker can be a weapon B, and the first and second terminal devices can cooperatively display the weapon A and the weapon B, and perform interaction.

Remote augmented reality interaction display among a plurality of terminal devices can be realized in the present disclosure, such that the purpose of interactive display can still be realized when the terminal devices are located in positions that are distant from each other.

Figure 7:
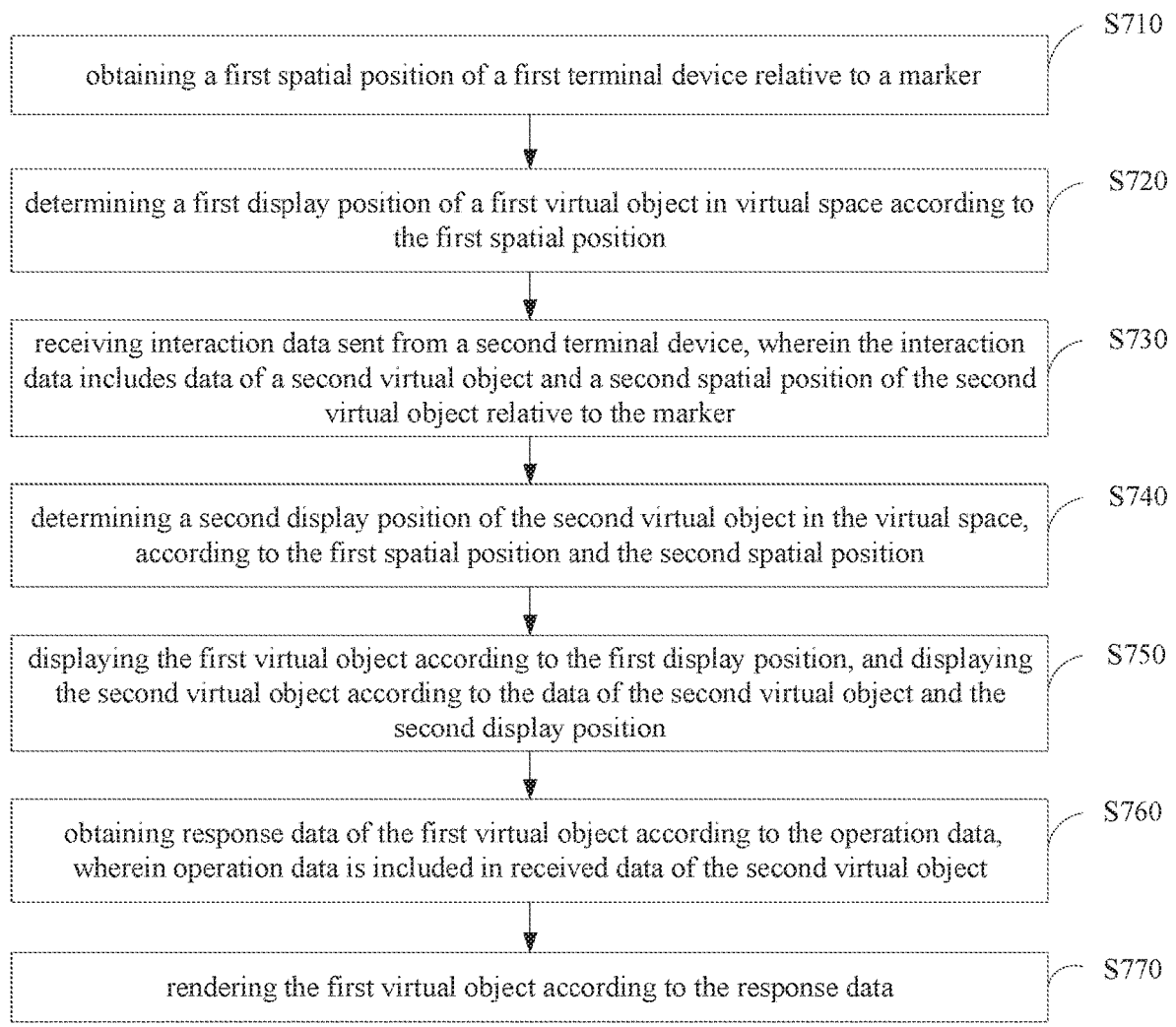
FIG. 7 is a flow chart of an interactive method provided by another embodiment of the present disclosure.

Referring to FIG. 7, another interactive method is provided by one embodiment of the present disclosure. The method may be performed by the third electronic device, and the method may include actions/operations in the following blocks.

At block S710, obtaining a first spatial position of a first terminal device relative to a marker.

At block S720, determining a first display position of a first virtual object in virtual space according to the first spatial position.

At block S730, receiving interaction data sent from a second terminal device, wherein the interaction data includes data of a second virtual object and a second spatial position of the second virtual object relative to the marker.

At block S740, determining a second display position of the second virtual object in the virtual space, according to the first spatial position and the second spatial position.

At block S750, displaying the first virtual object according to the first display position, and displaying the second virtual object according to the data of the second virtual object and the second display position.

At block S760, obtaining response data of the first virtual object according to the operation data, wherein operation data is included in received data of the second virtual object.

The interaction data sent from the second terminal device further includes operation data for the second virtual object. The operation data refers to control data for the second terminal device to control the second virtual object according to operation instruction of users, and can include data such as position changes, action pose changes, morphological changes of the second virtual object, which are not limited.

A user can control the second virtual object via an interaction device, the second terminal device generates operation data according to control operations, the second virtual object can perform corresponding changes and display according to the operation data, at the same time, the first virtual object can also perform corresponding changes and display according to the operation data of the second virtual object. The first terminal device can obtain response data of the first virtual object according to the operation data of the second virtual object, wherein the response data refers to generated data of the first virtual object in response to the operation data of the second virtual object, the response can be an effect change of a pose, a position, a model color, a size, etc., and is not limited herein.

In some embodiments, a corresponding relationship between the operation data and the response data can be stored in the first terminal device; after receiving the operation data, the first terminal device can read corresponding response data according to the corresponding relationship. For example, the first virtual object is a wild boar, and the second virtual object is a shotgun, when the operation data of the second virtual object is pose data of the shotgun toward a wild boar and action data of pressing a trigger, the response data of the first virtual object is rendering data of the wild boar being injured and bleeding.

At block S770, rendering the first virtual object according to the response data.

After obtaining the response data of the first virtual object, the first virtual object can be re-rendered according to the response data, such that effect of the first virtual object can be displayed corresponding to the response data. In the aforementioned example, the obtained response data is rendering data of the wild boar being injured and bleeding, effect of the wild boar being injured and bleeding is rendered according to the rendering data, such that a position on the body of the wild boar toward the shotgun displays the effect of being injured and bleeding.

In some embodiments, the first terminal device, when receiving operation data for the first virtual object, can send the operation data to the second terminal device; the second terminal device obtains response data corresponding to the second virtual object, and renders the second virtual object.

In some embodiments, the first terminal device, after obtaining the response data corresponding to the operation data of the second terminal device, may also render and display the first virtual object in combination with the position and pose data of the first terminal device or operation data which is input by a user and input aiming at the first virtual object. In some embodiments, a user can operate the first virtual object, the first terminal device can obtain an operation signal of the user for the first virtual object, and can re-render the first virtual object according to the operation signal.

In some embodiments, when the data of the second virtual object includes the operation data, the first terminal device can display the effect corresponding to the operation data, and the effect can be embodied in the first virtual object and the second virtual object. The first terminal device can re-render the second virtual object according to the operation data for the second virtual object, such that the displayed second virtual object is synchronous to the second terminal device, and re-determine the display coordinate of the second virtual object in the virtual space based on the operation data, wherein the operation data can include data such as pose changes, action releases, position movements of the second virtual object. For example, when the first virtual object is a person 1, the second virtual object is a person 2, and the operation data includes pose data of a hand of the person 2 toward the person 1, application data of a pushing action, and position movement data of a movement towards the direction of the person 1, a display coordinate of the person 2 offsets towards the direction of the person 1 from a previous display coordinate, and display coordinates of parts of a body of the person 2 correspond to the above pose data and action application data.

In some embodiments, the first terminal device can re-render the first virtual object according to the operation data for the second virtual object, that is, according to the second virtual object data such as pose changes, action releases, position movements, and the like in the operation data, determine effect of the second virtual object affecting on the first virtual object, and determine the display coordinate of the first virtual object in display space according to the effect. In some embodiments, the first terminal device can determine whether the first virtual object and the second virtual object meet predetermined preset rules according to the first display position of the first virtual object and the second display position of the second virtual object. Wherein, the preset rules can be whether positions coincide, whether a distance therebetween is less than a certain distance, whether a distance therebetween is larger than a certain distance, whether positions are adjacent, and the like. Specific preset rules are not limited in the present disclosure, and can be determined according to actual requirements.

When the first virtual object and the second virtual object meet a preset rule, effect corresponding to the present rule can be added into the first virtual object and the second virtual object, so as to display the effect corresponding to the preset rule. As one example, rendering data of the effect corresponding to the preset rule can be read, and the first virtual object and the second virtual object are rendered according to the rendering data, such that the effect is added into the first and second virtual objects.

For example, the first virtual object is the person 1, the second virtual object is the person 2, the preset rule is that the person 1 and the person 2 superimposed and displayed in the real space are adjacent to each other, and the effect corresponding to the preset rule can be that the person 1 and the person 2 perform an action of shaking hands. When determining that positions of the person 1 and of the person 2 are adjacent according to the display coordinates of the person 1 and of the person 2, effect of the action of shaking hands can be rendered on the person 1 and the person 2, and a user can observe that the person 1 and the person 2 shake hands.

In some embodiments, the second terminal device also displays both the first virtual object and the second virtual object. The first terminal device obtains a fourth spatial position of the first virtual object relative to the marker, and sends data of the first virtual object and the fourth spatial position to the second terminal device; the second terminal device can generate the first virtual object according to the data of the first virtual object and the fourth spatial position, and display the first virtual object.

The interaction display methods can realize interaction of a plurality of terminal devices among virtual objects by controlling the virtual objects, and display corresponding interaction effect, thereby enhancing immersion and interaction.

The interaction display methods are also applicable for three or more than three terminal devices to perform interaction display. When three or more than three terminal devices perform interaction display, each terminal device also needs to obtain a display position of its corresponding virtual object, receive interaction data of virtual objects sent from other terminal devices, then determine display positions of virtual objects of other terminal devices, and finally display the virtual objects corresponding to other terminal devices together at the same time of displaying its own corresponding virtual object.

Figure 8:
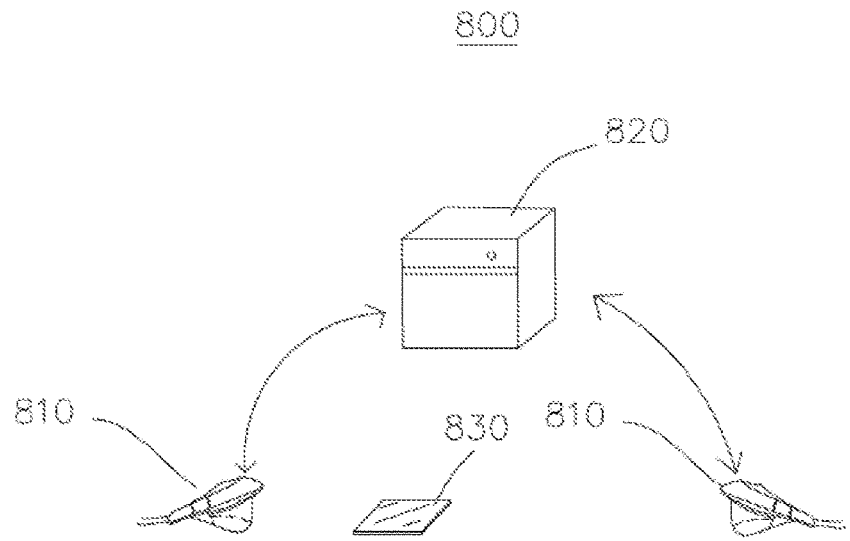
FIG. 8 is a schematic view of an augmented reality system provided by another embodiment of the present disclosure.

Referring to FIG. 8, another embodiment of the present disclosure provides an augmented reality system 800 comprising a plurality of terminal devices 810, a server 820, and at least one marker 830. The terminal devices 810 are in communication connection with the server 820 to realize data interaction. The plurality of terminal devices 810 can display virtual content according to the marker 830, and each terminal device 810 can upload operation data for the virtual content to the server 820 in real time, the server 820 can generate virtual content data in real time according to the operation data and send the virtual content data to each connected terminal device 810, each terminal device 810 can display virtual content according to virtual content data received in real time.

Figure 9:
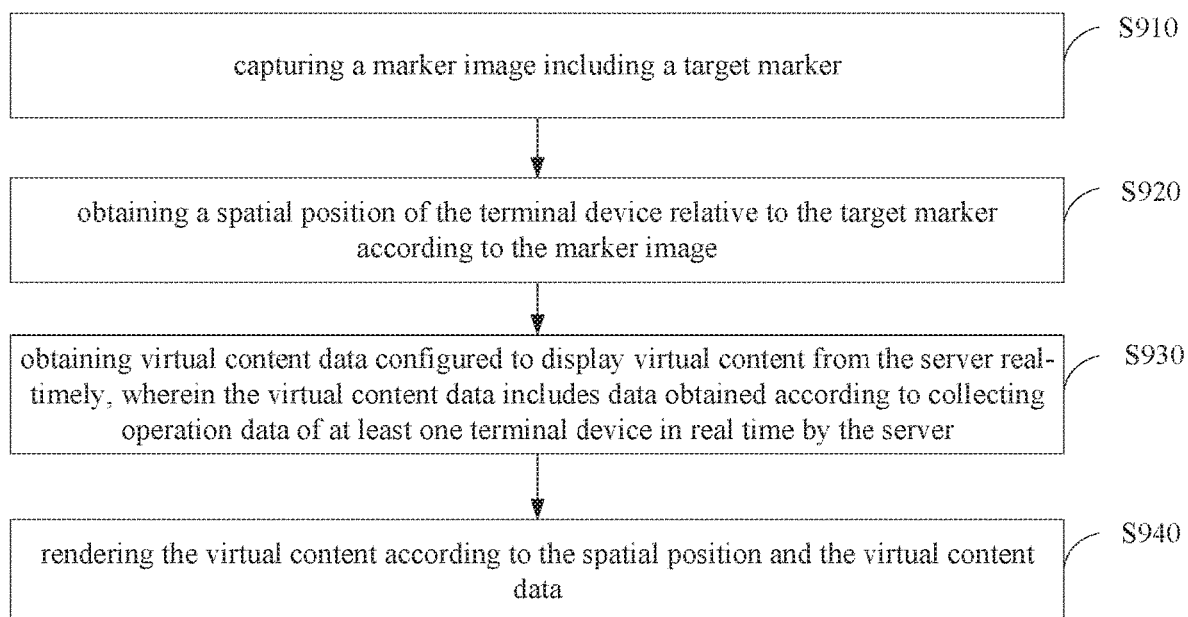
FIG. 9 is a flow chart of an interactive method provided by another embodiment of the present disclosure.

Referring to FIG. 9, the present disclosure provides an interaction display method, which can be applied in a terminal device of the augmented reality system 800, the terminal device can be any terminal device in the system. The method may be performed by the fourth electronic device, and the method may include actions/operations in the following blocks.

At block S910, capturing a marker image including a target marker.

When the terminal device generates and displays virtual content, a camera of the terminal device can capture images with a target marker in a visual range of the camera, the terminal device can obtain the marker image and determine a spatial position of the target marker, so as to determine a display position of virtual content in virtual space.

At block S920, obtaining a spatial position of the terminal device relative to the target marker according to the marker image.

The terminal device can identifies and tracks the marker image to obtain a spatial position of the terminal device relative to the target marker, identity of the target marker, etc. Wherein, the spatial position includes position and pose.

At block S930, Obtaining virtual content data configured to display virtual content from the server real-timely, wherein the virtual content data includes data obtained according to collecting operation data of at least one terminal device in real time by the server.

When the terminal device displays virtual content, it can obtain virtual content data of the virtual content in real time from the server. The server can collect operation data of at least one connected terminal device in real time, and obtain virtual content data according the collected operation data. Wherein, the operation data can be data of the terminal device operating virtual content according to received operation instruction for virtual content, the operation can be any operation for virtual content, for example, moving, editing, or other interaction operations. The server can be connected with one or more terminal device(s), and collect operation data of each connected terminal device in real time, so as to generate corresponding virtual content data according to the operation data.

At block S940, rendering the virtual content according to the spatial position and the virtual content data.

The terminal device can obtain a display position of virtual content according to a relative position relation between the virtual content and the target marker, and a spatial position of the terminal device relative to the target marker, that is, obtain a rendering coordinate of the virtual content in virtual space, and render and display the virtual content in the virtual space according to the display position and the virtual content data obtained in real time from the server, a user can observe the virtual content superimposed with a real scene via a wearable terminal device such as a head mounted display.

The above method can enable the plurality of terminal devices in the system to display the same virtual content. When any terminal device obtains operation data, that is, when a user of any terminal device operates virtual content, each terminal device in the system can present effect of the virtual content corresponding to the operation data, such that effect of the virtual content presented by all terminal devices keep consistent.

The interaction display method provided by this embodiment of the present disclosure can realize effect of synchronizing operation data for virtual content of a plurality of terminal devices, so as to realize synchronous display for corresponding virtual content among devices, and improve interaction.

Figure 10:
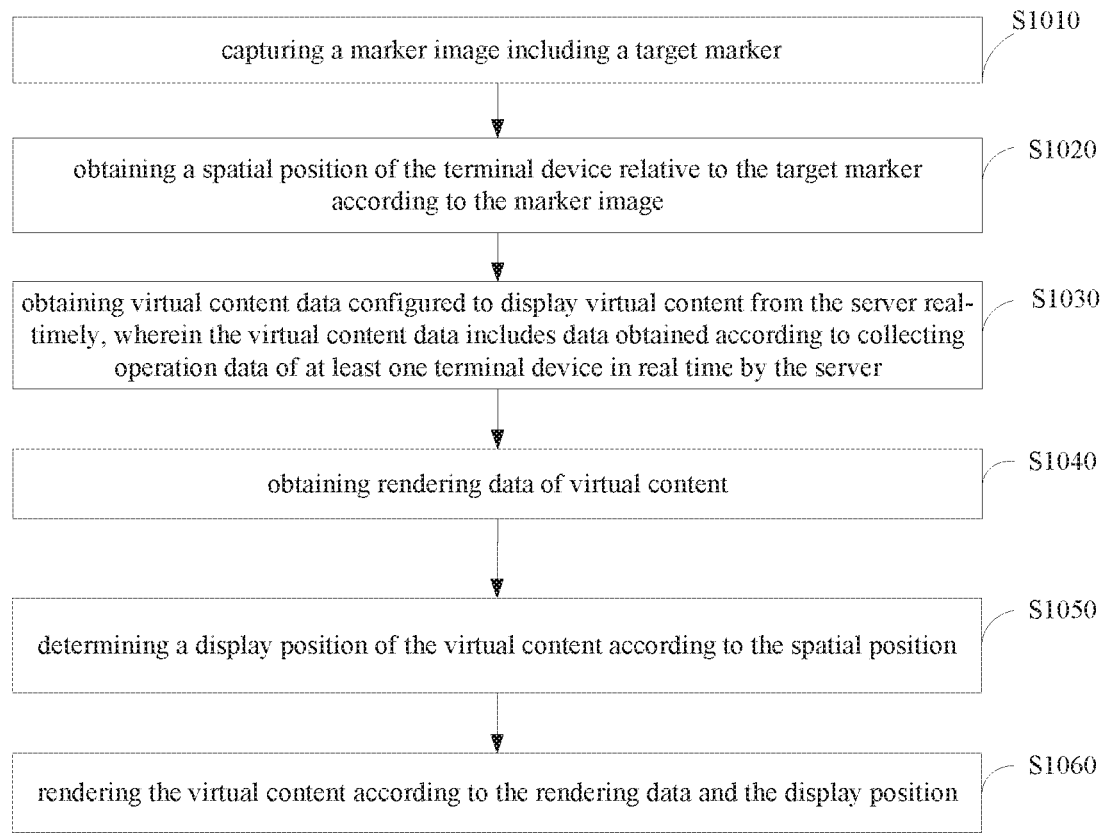
FIG. 10 is a flow chart of an interactive method provided by another embodiment of the present disclosure.

Referring to FIG. 10, an interaction display method provided by another embodiment of the present disclosure is applied in a terminal device, the terminal device can be any terminal device in the above system. The method may be performed by the fifth electronic device, and the method may include actions/operations in the following blocks.

At block S1010, capturing a marker image including a target marker.

At block S1020, obtaining a spatial position of the terminal device relative to the target marker according to the marker image.

At block S1030, obtaining virtual content data configured to display virtual content from the server real-timely, wherein the virtual content data includes data obtained according to collecting operation data of at least one terminal device in real time by the server.

The virtual content data can include rendering data configured to render virtual content. The server can generate corresponding rendering data according to operation data of at least one terminal device collected in real time, the rendering data can be model data of virtual content obtained after effect corresponding to operation data is applied to virtual content. In other words, the rendering data, when the terminal device is used to display, can be used to display virtual content applied with virtual effect corresponding to the operation data, so as to realize operation for virtual content. Wherein, the effect corresponding to the operation data can include posture changes and/or position changes of virtual content, color changes and/or size changes of models, which is not limited herein. For example, the operation data is operation data of cutting a certain part of virtual content, and the rendering data is model data corresponding to the cutted virtual content.

At block S1040, obtaining rendering data of virtual content.

The rendering data of virtual data can be obtained from the virtual content data obtained from the server, and is configured to generate virtual content applied with corresponding effect.

At block S1050, determining a display position of the virtual content according to the spatial position.

At block S1060, rendering the virtual content according to the rendering data and the display position.

The terminal device can generate and display virtual content in virtual space according to the display position and the rendering data. A user can observe display effect of the virtual content superimposed with a real scene via a wearable terminal device such as a head mounted display. Since the rendering data rending virtual content is model data of virtual content obtained after corresponding effect is applied in the virtual content, the rendered and displayed virtual content can present the corresponding effect. For example, the rendering data is model data corresponding to virtual content after cutting a certain part, and the corresponding rendered and displayed virtual content is the cutted virtual content.

In some embodiments, when spatial positions of terminal devices relative to the target marker are different, angles and positions of their displayed virtual content are different too. For example, the virtual content is an animal model, positions of two terminal devices relative to the target marker are in an opposite state, one terminal device can display a front view of the animal model, and the other terminal device can display a back view of the animal model.

Figure 11A:
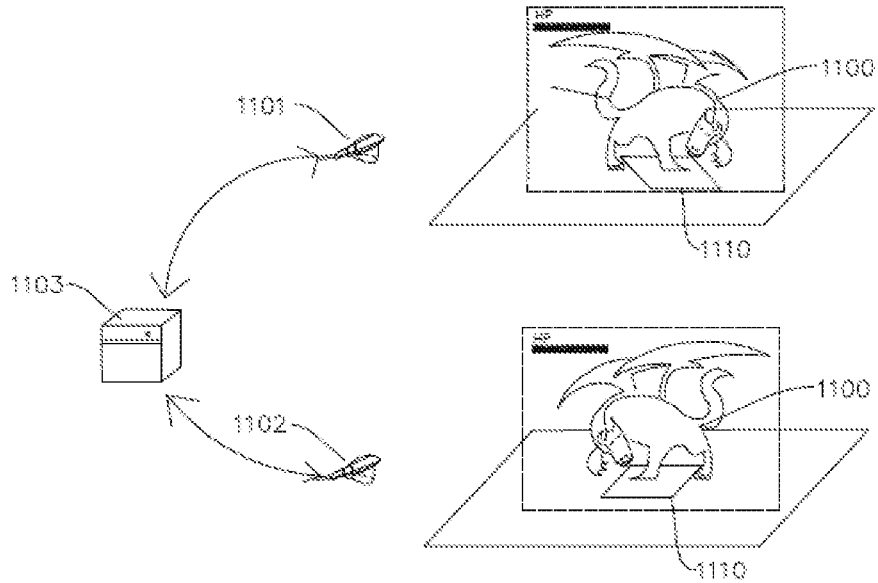
FIGS. 11a-11c are schematic views of scenario applications of one embodiment of the present disclosure.
Figure 11B:
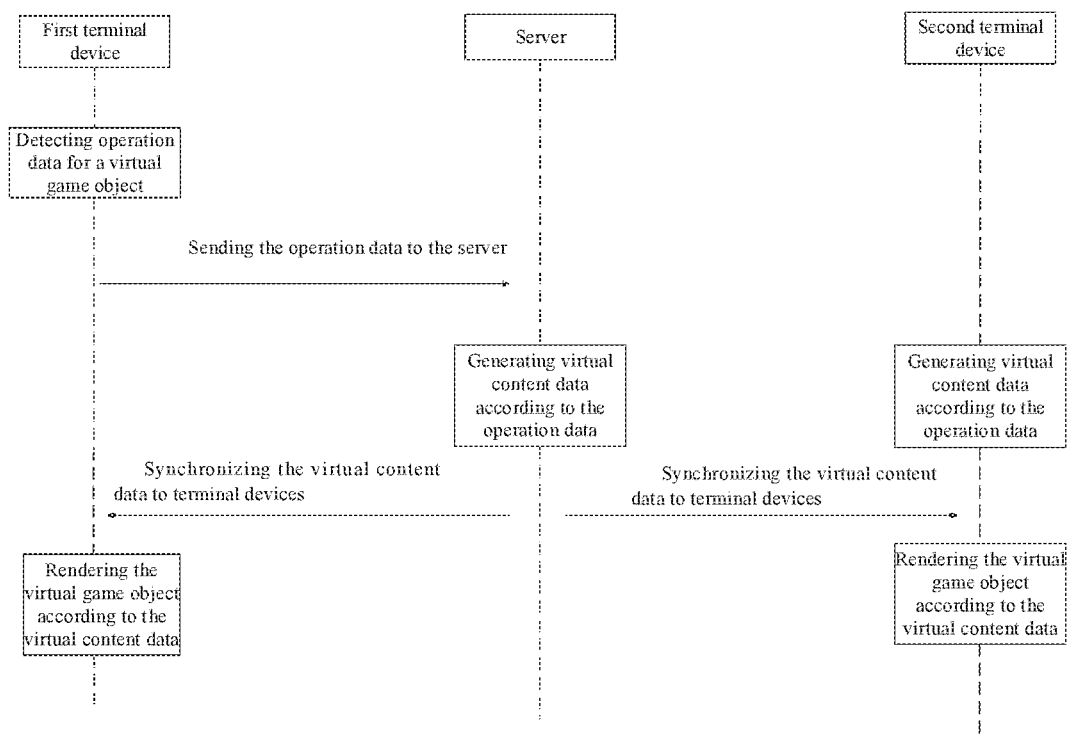
Figure 11C:
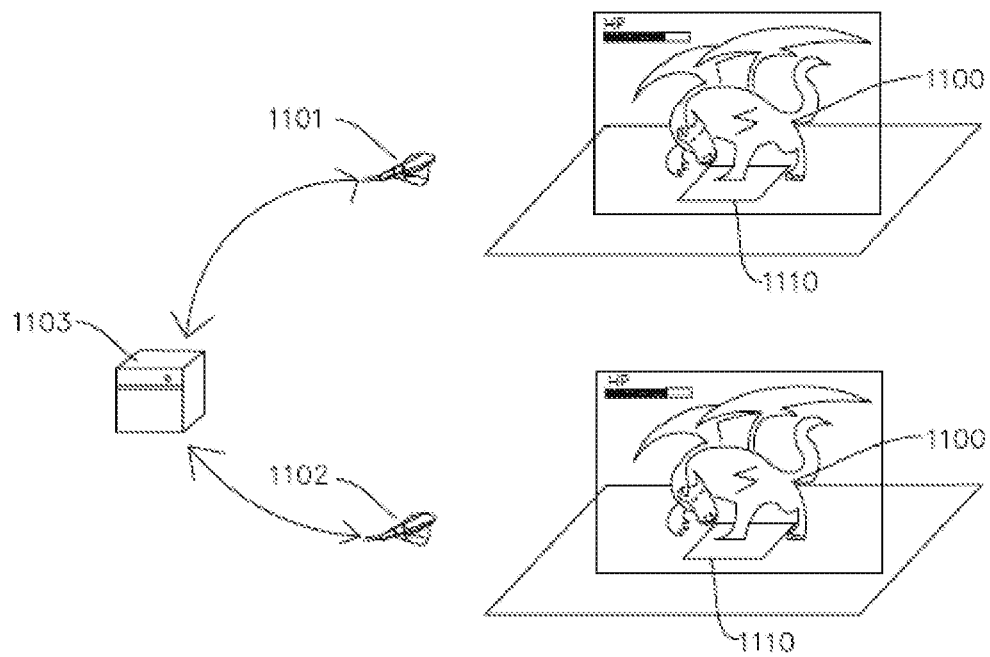

Referring to FIG. 11a, in a scene, virtual content can be a virtual game object 1100 in a game, such as a monster; both a first terminal device 1101 and a second terminal device 1102 display the virtual game object 1100 and a hit point associated with the virtual game object 1100. Since positions of the first terminal device 1101 and of the second terminal device 1102 relative to the target marker 1110 are different, angles of respectively displayed virtual content will also be different. An interaction display method provided by one embodiment of the present disclosure can enable a plurality of terminal devices to display effect corresponding to operation data of all terminal devices on the virtual game object in real time. When a user of any terminal device performs a strike operation to the monster in the game, the effect can be displayed on each terminal device in real time, that is, the effect of the struck monster (e.g., bleeding, a HP change, etc.) is synchronously displayed. As shown in FIG. 11b, the first terminal device 1101, after obtaining operation data for the virtual game object, can send the operation data to a server 1103; the server 1103, after receiving the operation data sent from the first terminal device 1101, generates virtual content data according to the operation data, and synchronously sends the virtual content data to the connected first terminal device 1101 and second terminal device 1102; the terminal devices, after receiving the virtual content data, update display of the virtual game object, and synchronously display updated virtual game objects. Referring to FIG. 11c, when the operation data is operation data of strikes to the virtual game object 1100, finally, the first terminal device 1101 and the second terminal device 1102 can synchronously display the virtual game object 1100 with a changed HP, thereby realizing a plurality of users joining a game and improving interest.

The interaction display method provided by this embodiment of the present disclosure can synchronize effect of operation data for virtual content of a plurality of terminal devices, realize synchronous display corresponding to the virtual content among the devices, and improve interaction.

Figure 12:
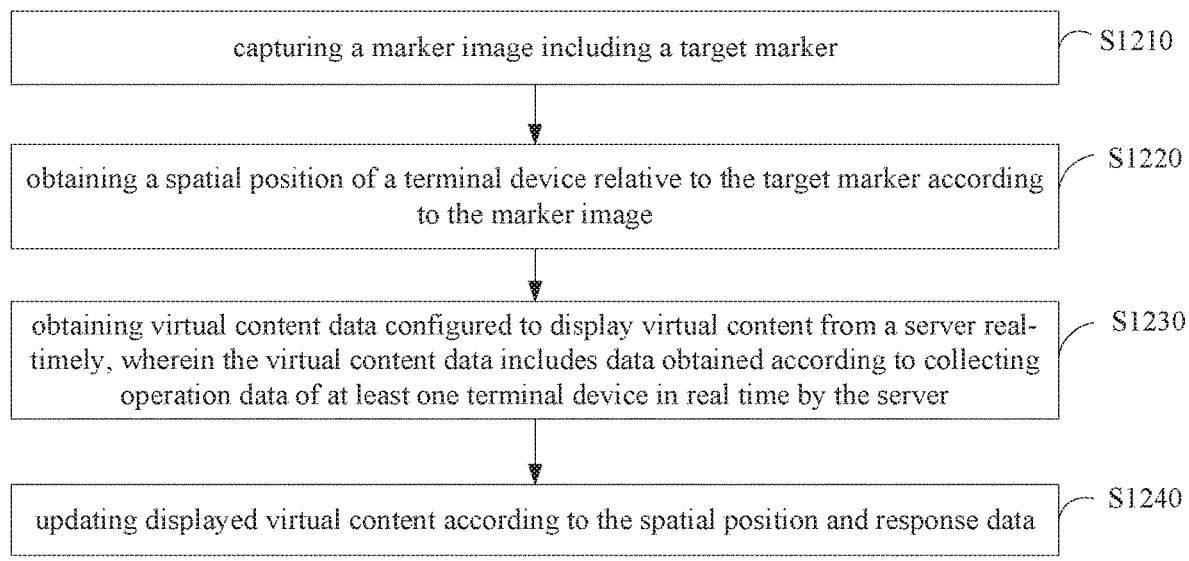
FIG. 12 is a flow chart of an interactive method provided by another embodiment of the present disclosure.

Referring to FIG. 12, an interaction display method of a further embodiment of the present disclosure is applied in a terminal device. The method may be performed by the sixth electronic device, and the method may include actions/operations in the following blocks.

At block S1210, capturing a marker image including a target marker.

At block S1220, obtaining a spatial position of a terminal device relative to the target marker according to the marker image.

At block S1230, obtaining virtual content data configured to display virtual content from a server real-timely, wherein the virtual content data includes data obtained according to collecting operation data of at least one terminal device in real time by the server.

The virtual content data can include response data generated based on a response to the virtual content generated by the operation data, which can be response data created by the server according to executing operation data uploaded in real time by at least one terminal device. The server can generate corresponding response data according to operation data of a plurality of terminal devices collected in real time, so as to render change effect of virtual content after being controlled corresponding to the operation data. A terminal device, after obtaining the response data from the server, can render the virtual content according to the response data and update display of the virtual content, the updated virtual content can present corresponding change effect, thereby realizing operation for the virtual content. For example, the operation data is operation data for adjusting colors of virtual content, and the response data is data for changing the colors of the virtual content.

At block S1240, updating displayed virtual content according to the spatial position and response data.

The terminal device determines a display position of the virtual content according to the spatial position relative to the target marker, and renders the updated virtual content according to the response data received from the server, such that the displayed virtual content presents corresponding effect. Since the response data is generated according to obtaining the operation data of the terminal device in real time by the server, virtual content displayed by a plurality of terminal devices in a system can be kept being consistent.

The method can synchronize response data obtained by the server according to operation data obtained by a plurality of terminal devices in real time during a process of synchronously displaying virtual content by the plurality of terminal devices, and render updated virtual content with effect corresponding to the response data, such that all terminal devices synchronously update the displayed virtual content. In other words, when the plurality of terminal devices in the system display the same virtual content, and a user of any terminal device operates the virtual content, each terminal device in the system can synchronously display operated virtual content.

In some embodiments, the terminal device can detect the operation data in real time, so as to synchronize the operation data to the server, the server can generate response data according to received operation data, and synchronize the response data to the plurality of terminal devices. Wherein, detecting the operation data of virtual content can be detecting operation of a controller for the virtual content, and may also be detecting gesture operation of a user for the virtual content; specific methods for detecting the operation data are not limited.

The interaction display method provided by this embodiment of the present disclosure can synchronize effect of operation data of a plurality of terminal devices for virtual content, realize synchronous display of corresponding virtual content among devices, and improve interaction.

Figure 13:
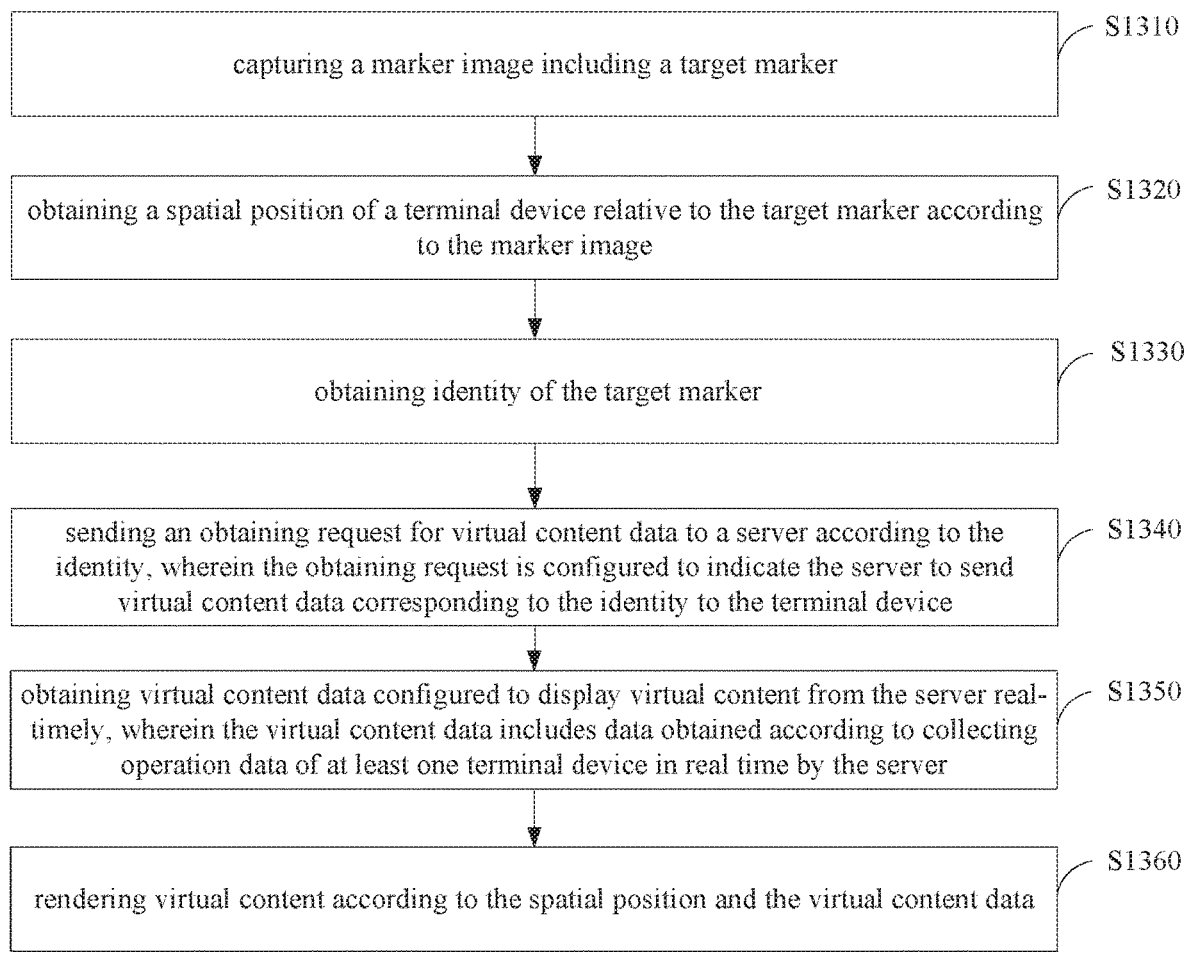
FIG. 13 is a flow chart of an interactive method provided by another embodiment of the present disclosure.

Referring to FIG. 13, an interaction display method of a further embodiment of the present disclosure is applied in a terminal device. The method may be performed by the seventh electronic device, and the method may include actions/operations in the following blocks.

At block S1310, capturing a marker image including a target marker.

At block S1320, obtaining a spatial position of a terminal device relative to the target marker according to the marker image.

At block S1330, obtaining identity of the target marker.

In some embodiments, the terminal device can identify identity of the target marker according to the marker image, obtain virtual content data according to the identity, and display virtual content corresponding to the target marker.

At block S1340, sending an obtaining request for virtual content data to a server according to the identity, wherein the obtaining request is configured to indicate the server to send virtual content data corresponding to the identity to the terminal device.

In some embodiments, the terminal device can generate an obtaining request configured to obtain virtual content data corresponding to the identity according to identity of the marker target object, and send the obtaining request to the server. The server can return virtual content data corresponding to the identity to the terminal device. Identity of different target markers can correspond to different virtual content, and the terminal device can display different virtual content by identifying different target markers.

At block S1350, obtaining virtual content data configured to display virtual content from the server real-timely, wherein the virtual content data includes data obtained according to collecting operation data of at least one terminal device in real time by the server.

At block S1360, rendering virtual content according to the spatial position and the virtual content data.

The terminal device can display virtual content according to the spatial position of the terminal device relative to the target marker, and virtual content data obtained from the server. In some embodiments, virtual content data obtained by the terminal device can be original content, the original content means virtual content of any terminal device which is not displayed or interacted; and may also not be original content, that is, virtual content which has already been displayed or interacted in other terminal devices.

In some embodiments, the terminal device obtains virtual content data corresponding to identity of the target marker from the server, and can determine whether the virtual content data is original content. When the obtained virtual content data is original content, it indicates that there is not any other terminal device displaying or interacting the virtual content, that is, the terminal device is the first device performing interactive display for the virtual content; the terminal device can display relevant prompt information to prompt a user whether to generate a virtual interaction mode, wherein, the virtual interaction mode can refer to a mode performing interactive display for virtual content corresponding to identity. After the terminal device displays the prompt information, first instruction configured to instruct generating the virtual interactive mode can be detected. When the first instruction has been detected, it indicates that a user of the terminal device needs to generate the virtual interaction mode, that is, generate interactive display for the virtual content, therefore, virtual content can be generated and displayed according to the spatial position of the terminal device relative to the target marker and the obtained virtual content data, and the terminal device can perform interaction operation with the virtual content. When the virtual content data is original content, the virtual content data can be original model data of the virtual content, therefore, virtual content can be rendered according to the original model data, and superimposed and displayed in real space. After the terminal device creates the virtual interaction mode, it can wait other terminal devices to join the virtual interaction mode, to realize common interaction for virtual content.

In some embodiments, when the obtained virtual content data is not original content, it indicates that there has already been another terminal device displaying the virtual content corresponding to the identity, that is, there has already been another terminal device generating a virtual interaction mode. The terminal device can display relevant prompt information to prompt a user whether to join the virtual interaction mode. At this time, second instruction configured to instruct joining the generated virtual interaction mode can be detected; when the second instruction has been detected, it indicates that a user corresponding to the terminal device needs to join the virtual interaction mode, and the virtual content can be commonly interacted and synchronously displayed according to the spatial position of the terminal device relative to the target marker and the obtained virtual content data. When the virtual content data is not original content, the virtual content data can be current model data of virtual content, therefore, current virtual content can be rendered according to the current model data, and superimposed and displayed in real space, thereby realizing synchronous display of virtual content which has already been displayed on another terminal device of the virtual interaction mode at present.

In some embodiments, the terminal device can send information carrying a terminal identification of the terminal device to the server; the server can establish a corresponding relationship between the terminal identification and the identity of the marker, or establish a corresponding relationship between the terminal identification and the virtual interaction mode, according to the terminal identification. By establishing the above corresponding relationship, when realizing data synchronization of a plurality of terminal devices, the server can be enabled to synchronously send virtual content data to all terminal devices belonging to the same virtual interaction mode according to the terminal identifications.

In a scene, the virtual content is a virtual game object, such as a monster. When the terminal device enters this game, the virtual game object can be original content of a new game entered by the terminal device, and may also be non-original content of a game which has already been performed by another terminal device. When prompting a user whether to generate or join a game and receiving relevant instruction input by the user, the terminal device preliminarily displays corresponding virtual content according to the virtual content data and the spatial position relative to the marker; in subsequent display for the virtual display object, virtual game object data generated according to operation data of a plurality of terminal devices joining the game can be obtained from the server in real time, for example, virtual game object data generated according to struck operations to the monster in the game; the virtual game object is updated in real time according to operations of the plurality of terminal devices for the virtual game object, so as to realize that the plurality of terminal devices real-timely and synchronously present effect corresponding to operation data of all terminal devices on the virtual game object. For example, when any terminal device obtains data of striking the monster in the game, each terminal device in the system can real-timely present the effect of virtual content, thereby synchronously presenting the effect of the struck monster, enabling a plurality of users to join the game commonly, and improving interaction interest.

In some embodiments, one embodiment of the present disclosure provides a terminal device comprising a memory and a processor, the memory stores a computer program; the computer program, when being executed by the processor, enables the processor to realize the method of the above embodiments.

In some embodiments, one embodiment of the present disclosure provides a computer storage medium, which stores a computer program therein; the computer program, when being executed by the processor, enables the processor to realize the method of the above embodiments.

One of ordinary skill in the art can understand that all or some Blocks of the above embodiment can be implemented by hardware, and may also be implemented by instructing relevant hardware using a program. The program can be stored in a computer readable memory medium, the aforementioned memory medium can be a non-volatile memory, a disk, a CD-ROM, etc.

The above descriptions are only preferred embodiments of the present disclosure, and are not intended to limit the present disclosure in any form. Although the present disclosure has been disclosed above by the preferred embodiments, the embodiments are not intended to limit the present disclosure. Those skilled in the art can make some changes or modifications as equivalent embodiments with equivalent transformations using the technical content disclosed above without departing from the scope of the technical solution of the present disclosure. Any simple amendments, equivalent changes and modifications which are not departing from the content of technical solutions of the present disclosure and made to the above embodiments in accordance with the technical spirit of the present disclosure are still within the scope of the technical solutions of the present disclosure.

What is claimed is:

1. An interactive method for interaction between users with terminal devices in augmented reality, comprising:
    associating a first terminal device with a first marker, and associating a second terminal device with a second marker other than the first marker;
    using the first terminal device to identify the first marker, obtain a first identity corresponding to the first marker, and obtain a first virtual object according to the first identity;
    and using the second terminal device to identify the second marker, obtain a second identity corresponding to the second marker, and obtain a second virtual object according to the second identity;
    obtaining, by the first terminal device, a first spatial position of the first terminal device relative to the first marker;
    determining, by the first terminal device, a first display position of the first virtual object in virtual space according to the first spatial position;
    receiving, by the first terminal device, interaction data sent from the second terminal device, wherein the interaction data includes model data of the second virtual object and a second spatial position of the second virtual object relative to the second marker;
    determining, by the first terminal device, a second display position of the second virtual object in virtual space according to the first spatial position and the second spatial position;
    generating, by the first terminal device, the first virtual object according to the first display position, and the second virtual object according to the data of the second virtual object and the second display position; and
    displaying, by each of the first and second terminal devices, the first virtual object and the second virtual object, and further displaying interaction effect between the first virtual object and the second virtual object.

2. The method of claim 1, wherein determining the second display position of the second virtual object in virtual space comprises:
    converting the second spatial position of the second virtual object relative to the second marker into a third spatial position of the second virtual object relative to the first marker; and
    determining the second display position of the second virtual object according to the first spatial position and the third spatial position.

3. The method of claim 1, wherein the received data of the second virtual object includes operation data, the method further comprising:
    obtaining response data of the first virtual object according to the operation data; and
    rendering the first virtual object based on the response data.

4. The method of claim 3, further comprising:
    controlling the second virtual object via an interaction device to generate the operation data;
    using the second virtual object to perform corresponding changes and display according to the operation data; and at the same time, using the first virtual object to perform corresponding changes and display according to the operation data; and
    using data generated by the first virtual object in response to the operation data of the second virtual object as the response data.

5. The method of claim 1, the received data of the second virtual object includes operation data, the method further comprising:
    re-determining the second display position of the second virtual object according to the operation data;
    re-determining the first display position of the first virtual object according to the operation data; and
    rendering the first virtual object according to the re-determined first display position, and rendering the second virtual object according to the currently received data of the second virtual object and the re-determined second display position.

6. The method of claim 1, the method further comprising:
determining whether the first virtual object and the second virtual object meet a preset rule, according to the first display position and the second display position; and
if the first virtual object and the second virtual object meet the preset rule, adding effect corresponding to the preset rule into the first virtual object and the second virtual object.

7. The method of claim 1, further comprising:
obtaining a fourth spatial position of the first virtual object relative to the first marker; and
sending data of the first virtual object and the fourth spatial position to the second terminal device, wherein the data of the first virtual object and the fourth spatial position are configured to indicate the second terminal device to generate the first virtual object at the same time of generating the second virtual object.

8. The method of claim 7, wherein obtaining the fourth spatial position comprises:
detecting an operation signal for the first virtual object input by a user; determining the first display position of the first virtual object based on the operation signal; and
determining the fourth spatial position of the first virtual object relative to the marker based on the first display position of the first virtual object and the first spatial position.

9. An augmented reality system for interaction between users with terminal devices in augmented reality, comprising:
a server;
at least one marker;
a plurality of terminal devices in communication connection with the server, wherein each of the plurality of terminal devices comprises:
one or more processors; and
memory storing one or more programs configured to be executed by the one or more processors, the one or more programs including instructions for:
obtaining a first spatial position of the terminal device relative to the at least one marker;
determining a first display position of a first virtual object in virtual space according to the first spatial position;
receiving interaction data sent from another terminal device, wherein the interaction data includes model data of a second virtual object and a second spatial position of the second virtual object relative to the at least one marker;
determining a second display position of the second virtual object in virtual space according to the first spatial position and the second spatial position;
generating the first virtual object according to the first display position, and the second virtual object according to the data of the second virtual object and the second display position; and
displaying the first virtual object and the second virtual object, and further displaying interaction effect between the first virtual object and the second virtual object;
wherein the plurality of terminal devices are configured to display virtual content according to the at least one marker and upload operation data for the virtual content to the server in real time, the server is configured to generate virtual content data in real time according to the operation data and sends the virtual content data to each of the plurality of terminal devices, so that each of the plurality of terminal devices displays virtual content according to virtual content data received in real time.

10. The system of claim 9, wherein the first spatial position is a spatial position of the terminal device relative to the first marker, and the second spatial position is a position of the second virtual object relative to the second marker; wherein determining the second display position of the second virtual object comprises:
converting the second spatial position of the second virtual object relative to the second marker into a third spatial position of the second virtual object relative to the first marker; and
determining the second display position of the second virtual object according to the first spatial position and the third spatial position.

11. The system of claim 9, wherein, the received data of the second virtual object includes operation data, the one or more programs further including instructions for:
obtaining response data of the first virtual object according to the operation data; and
rendering the first virtual object based on the response data.

12. The system according to claim 11, wherein, the one or more programs further includes instructions for:
controlling the second virtual object via an interaction device to generate the operation data;
using the second virtual object to perform corresponding changes and display according to the operation data; and at the same time, using the first virtual object to perform corresponding changes and display according to the operation data; and
using data generated by the first virtual object in response to the operation data of the second virtual object as the response data.

13. The system of claim 9, wherein, the received data of the second virtual object includes operation data, the one or more programs further including instructions for:
re-determining the second display position of the second virtual object according to the operation data;
re-determining the first display position of the first virtual object according to the operation data; and
rendering the first virtual object according to the re-determined first display position, and rendering the second virtual object according to the currently received data of the second virtual object and the re-determined second display position.

14. The system of claim 9, wherein, the one or more programs further include instructions for:
determining whether the first virtual object and the second virtual object meet a preset rule, according to the first display position and the second display position; and
if the first virtual object and the second virtual object meet the preset rule, adding effect corresponding to the preset rule into the first virtual object and the second virtual object.

15. The system of claim 9, wherein, the one or more programs further include instructions for:
obtaining a fourth spatial position of the first virtual object relative to the marker; and
sending data of the first virtual object and the fourth spatial position to the another terminal device, wherein the data of the first virtual object and the fourth spatial position are configured to indicate the another terminal device to generate the first virtual object at the same time of generating the second virtual object.

16. The system of claim 15, wherein obtaining the fourth spatial position comprises:
  detecting an operation signal for the first virtual object input by a user; determining the first display position of the first virtual object based on the operation signal; and
  determining the fourth spatial position of the first virtual object relative to the marker based on the first display position of the first virtual object and the first spatial position.

17. The system of claim 9, wherein, the server is further configured to: when the plurality of terminal devices display the same virtual content and any one of the plurality of terminal devices operates the virtual content, obtain operation data corresponding to the terminal device operating the virtual content and generate virtual content data corresponding to the operation data; and each of the plurality of terminal devices is further configured to obtain the virtual content data corresponding to the operation data from the server and render the virtual content according to a spatial position of the terminal device and the virtual content data corresponding to the operation data.

18. An augmented reality system for interaction between users with terminal devices in augmented reality, comprising:
  a server;
  at least one marker;
  a plurality of terminal devices in communication connection with the server, wherein each of the plurality of terminal devices comprises:
    one or more processors; and
    memory storing one or more programs configured to be executed by the one or more processors, the one or more programs including instructions for:
      obtaining a first spatial position of the terminal device relative to the at least one marker;
      determining a first display position of a first virtual object in virtual space according to the first spatial position;
      receiving interaction data sent from another terminal device, wherein the interaction data includes model data of a second virtual object and a second spatial position of the second virtual object relative to the at least one marker;
      determining a second display position of the second virtual object in virtual space according to the first spatial position and the second spatial position;
      generating the first virtual object according to the first display position, and the second virtual object according to the data of the second virtual object and the second display position; and
    displaying the first virtual object and the second virtual object, and further displaying interaction effect between the first virtual object and the second virtual object;
  wherein, the one or more programs further includes instructions for:
  associating a first terminal device of the plurality of terminal devices with a first marker, and associating a second terminal device of the plurality of terminal devices with a second marker other than the first marker;
  using the first terminal device to identify the first marker, obtain a first identity corresponding to the first marker, and obtain the first virtual object according to the first identity;
  and using the second terminal device to identify the second marker, obtain a second identity corresponding to the second marker, and obtain the second virtual object according to the second identity; and
  using each of the first and second terminal devices to display both the first and second virtual objects and interaction between the first and second virtual objects.

* * * * *